Figure 4:
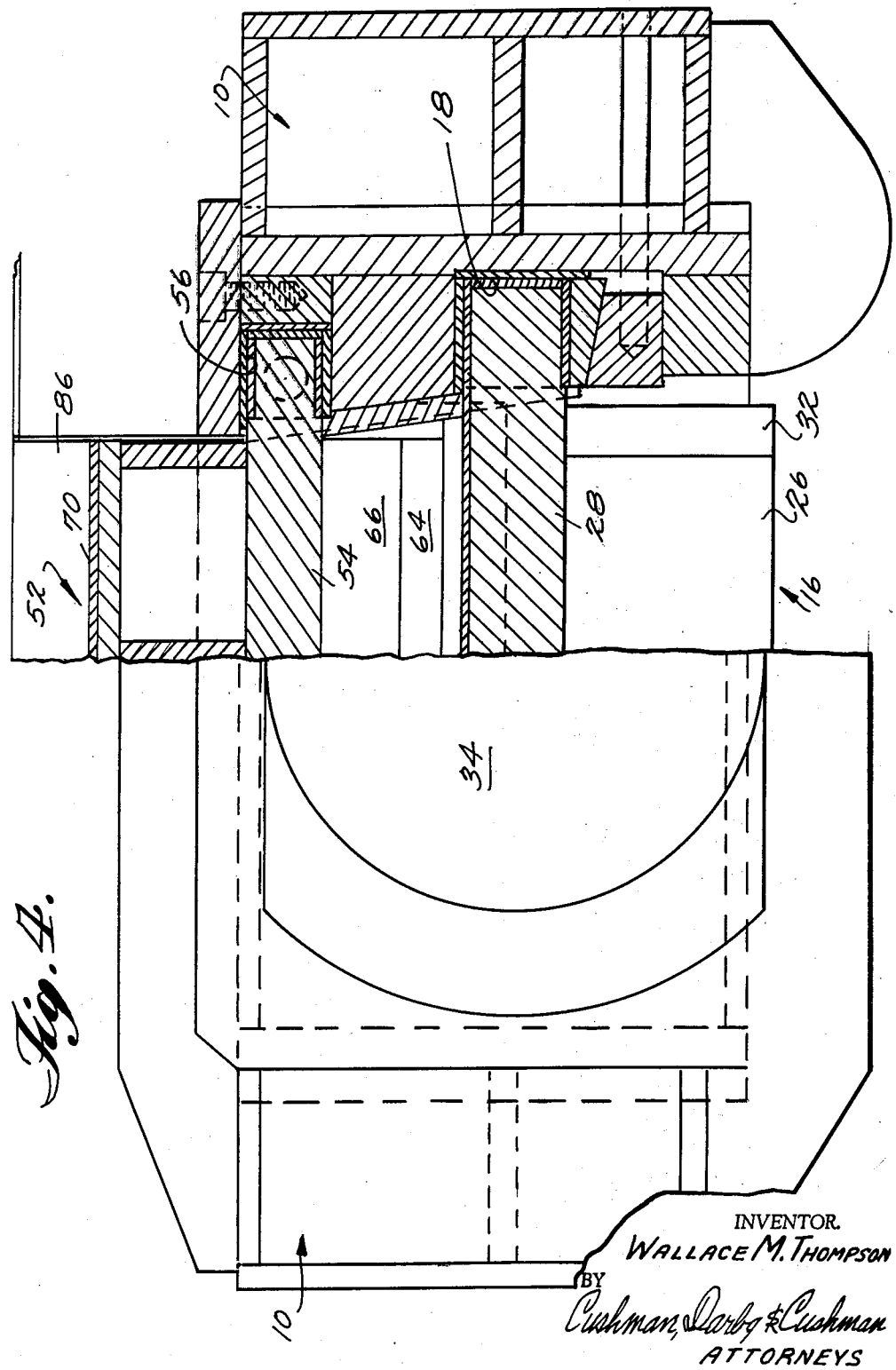

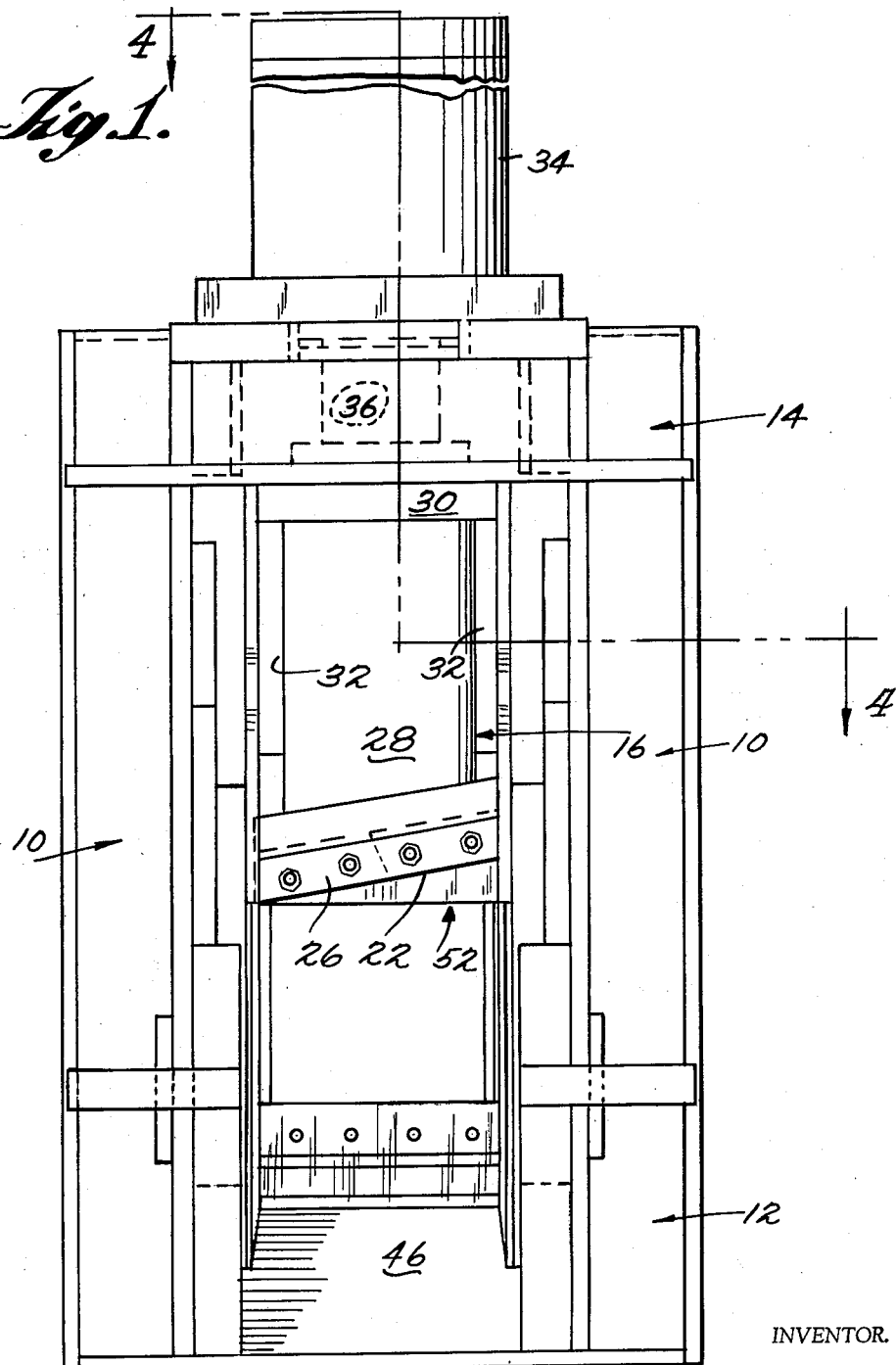

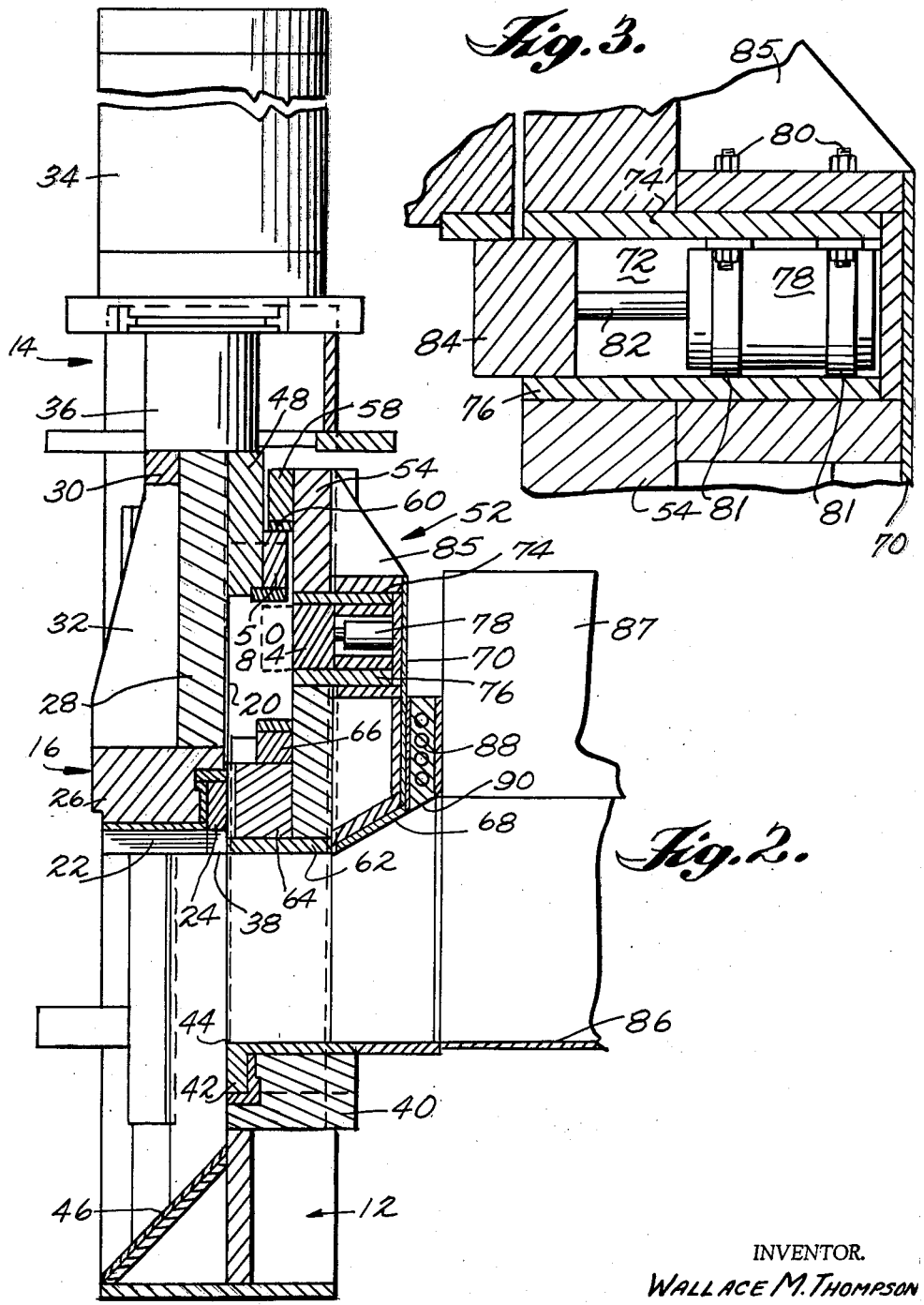

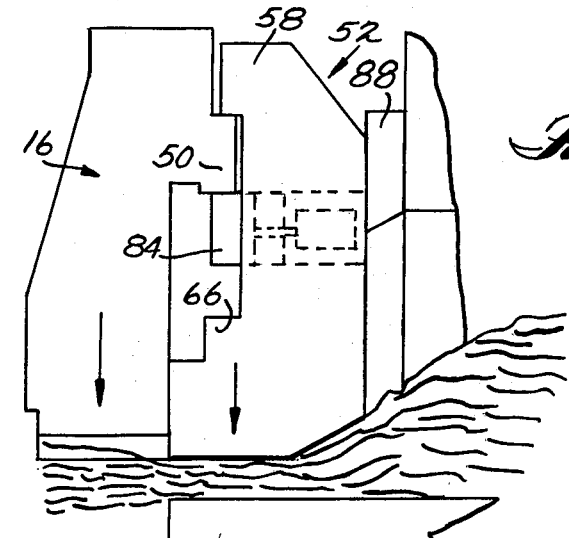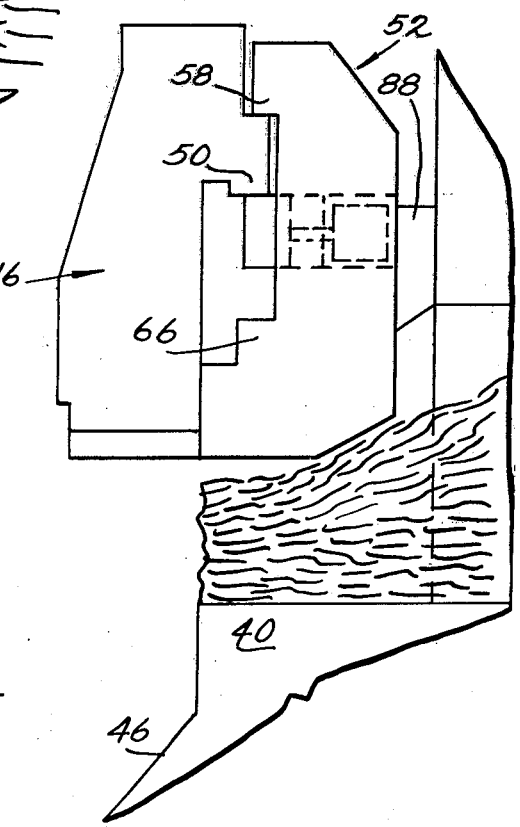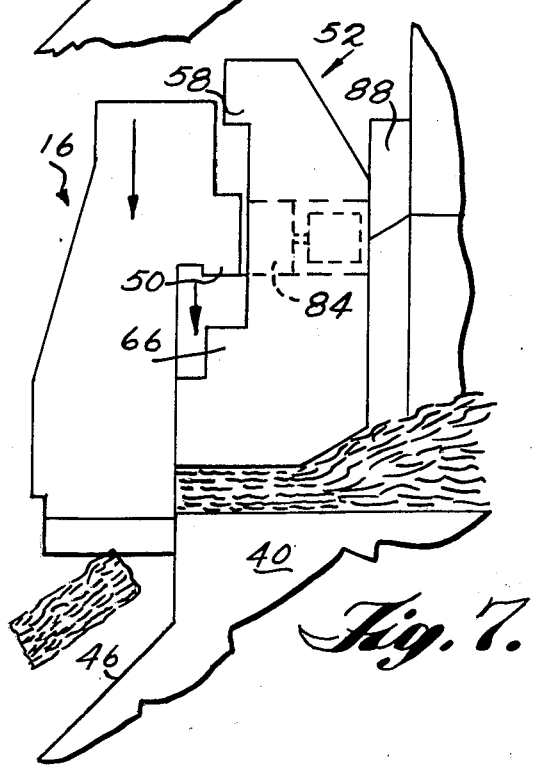

United States Patent Office 3,126,817
Patented Mar. 31, 1964

3,126,817
SHEARING APPARATUS
Wallace M. Thompson, Cordele, Ga., assignor to Harris Foundry & Machine Company, Cordele, Ga., a corporation of Georgia
Filed May 29, 1962, Ser. No. 198,580
6 Claims. (Cl. 100—98)

This invention relates to scrap metal shearing apparatus of the type having a movable shear and cooperative hold-down and compacting means, and constitutes an improvement on the invention disclosed in my copending application Serial No. 857,071, filed December 3, 1959, now Patent No. 3,037,446.

The above application discloses a shearing apparatus having a movable shear and hold-down means operative to compact the scrap metal prior to shearing, each of the instrumentalities is provided with a separate hydraulic motor, but all the hydraulic motors can be employed to operate either instrumentality. By virtue of this earlier arrangement the force is increased both for shearing the scrap metal as well as for holding down the scrap sufficiently to crush the same. To provide the combined force, means are provided for selectively locking the instrumentalities together, such as an abutment member operable by a hydraulic cylinder carried by the hold-down clamping means and detachably engageable with the movable shear blade.

While this earlier invention has enjoyed a marked degree of success, the present invention includes a new and improved shearing apparatus which avoids the requirement for two hydraulic cylinders, one for the movable shear and another for the hold-down clamping means. The instant construction thereby retains the advantages of the invention disclosed in the above application, but is of more simple and inexpensive construction.

According to this invention, there is provided a shearing apparatus having a movable shear driven by a hydraulic motor in the usual fashion. A work hold-down clamp, positioned adjacent the movable shear, is unpowered, and has a lost-motion connection with the movable shear. The movable shear is operative to lift the hold-down clamp to its full height or allows the latter to move downwardly upon the scrap together with the movable shear, subsequently allowing the shearing head to continue its downward travel for shearing the scrap. Locking means are provided for firmly fixing the hold-down clamp to the shearing head so that the latter can be used to force the hold-down clamp downwardly to compact the scrap metal prior to shearing the same.

As the scrap metal is sheared, the weight of the hold-down clamp is advantageously utilized to prevent the scrap from tilting upwardly, which would otherwise impair the shearing operation.

Still further according to this invention, the hold-down clamp includes an upwardly inclined bottom surface portion opposite the movable shear which reduces the amount of travel necessary for compacting purposes. As the hold-down clamp crushes the scrap metal, this metal is also crushed along this upwardly inclined surface, and the crushing action extends forwardly of the clamp back to the charging box. Accordingly, the scrap metal is preliminarily crushed adjacent the entrance to the hold-down clamp so that when the latter is raised, the scrap metal can be moved towards the movable shear.

Accordingly, this invention also contemplates the provision of a new and improved method of shearing scrap metal moved along a confined path wherein the scrap metal is angularly compacted at a first station, thence flattened at a second station, and then sheared at a third station, while other scrap metal is moving along the path and is compacted during the shearing step at the first and second stations.

Still further objects, advantages and novel features of the present invention will become evident in the specification and claims, taken in connection with the accompanying drawings.

In the drawings:
FIGURE 1 is a front elevational view of a shear embodying this invention;
FIGURE 2 is a vertical section view of the machine shown in FIGURE 1;
FIGURE 3 is an enlarged sectional view of the locking means according to a feature of this invention;
FIGURE 4 is a plan view, partially in section, taken substantially along line 4—4 in FIGURE 1; and
FIGURES 5–7 are diagrammatic elevational views of the sequence of shearing according to this invention.

Referring now to the accompanying drawings, there is shown a scrap metal shear having a frame composed of spaced, upright side members 10 interconnected by a bottom member 12 and a top member 14, all of such members being formed by suitably reinforced assemblies.

A shearing head or movable blade structure 16 is vertically movable in guideways 18 on the opposed inner sides of the side frame members 10, the shearing head 16 having a flat rear face 20 and a lower face 22 which is inclined to the horizontal, as best shown in FIGURE 1. Secured to the lower and inner edge of the shearing head 16 is a movable blade 24. The shearing head 16 includes a lower cross member 26 which carries the blade 24, a plate-like member 28 which extends upwardly from the cross member immediately above the blade 24 having its lateral edges received in the guideways 18, an upper cross member 30, and a plurality of upright stiffening and strengthening ribs or web plates 32 extending between the upper and lower members 30 and 26 in front of the member 28.

Mounted on the top of the frame member 14 is a double-acting hydraulic motor 34 having its depending piston rod 36 connected to the upper member 30 and the member 28 of the shearing head 16, for moving the latter vertically in its guideways 18.

Extending between the side frame members 10, somewhat above the bottom frame member 12 and only very slightly rearwardly of the vertical plane of movement of the cutting edge 38 of the movable blade 24, is a transverse bed member 40. Secured to the upper forward edge of the bed member 40 is a fixed blade 42 having a straight cutting edge 44 adapted to cooperate with the cutting edge 38 of the movable blade 24 in order to shear scrap resting on the bed 40 and projecting forwardly beyond the fixed blade. In front of the bed 40, and located therebelow, is a downwardly and forwardly inclined plate 46 constituting a chute for cut scrap.

Projecting from the back face 20 of the shearing head 16 is a horizontally extending abutment plate 48, having a longitudinally extending lower leg 50, this lower leg 50 conveniently being provided with wear plates along its top and bottom surfaces. The upper end of the abutment plate 48 is also joined to the piston 36 for rigidity purposes. For reasons to become apparent, this generally L-shaped plate structure is positioned above the bed member 40.

A work hold-down clamp structure 52 is mounted for vertical movement above the bed 40. This structure 52 includes an upright heavy plate 54 having its lateral edges received in vertical guideways 56 in the inner sides of the side frame members 10 (FIGURE 4). Joined to the top of the heavy plate 54 adjacent the shearing head 16 is a supporting plate 58 which normally rests on the top surface 60 of the lower leg 50 of the shearing head 16. By virtue of this arrangement, the weight of the hold-down clamp 52 is thereby supported by the shearing head 16.

The heavy plate 54 carries at its lower end a bottom horizontal cross member 62 which terminates above the straight cutting edge 44 of the bed member 40. This cross member 62 is reinforced by a transverse block 64 along its upper surface. Also, the block 64 carries along its upper surface a reinforcing member 66 in nested engagement with the adjacent surfaces of the heavy plate 54. The reinforcing member 66 has a wear plate on its upper surface.

As best shown in FIGURES 2 and 5–7, the lower leg 50 of the shear head 16 is vertically movable between the bottom surface of the supporting member 58 and the top surface of the reinforcing member 66. This constitutes a vertical lost-motion connection between the shear head 16 and the work hold-down clamp 52 for purposes which will become evident.

The hold-down clamp 52 also has an upwardly inclined bottom plate 68 suitably reinforced, which is joined at its lower end to the heavy plate 54, and terminates at its uppermost end opposite the shear head 16. This uppermost end of the inclined bottom plate 68 is joined to a vertical transverse plate 70, suitably reinforced, which defines the rear wall of the hold-down clamp 52.

Means are provided for selectively locking the shear head 16 with the hold-down clamp 52 so that these two elements can move together in unison. To this end, the heavy plate 54 has a transverse opening at 72 facing the shear head 16, the plate 54 carrying upper and lower liner plates 74 and 76, respectively, along the respective upper and lower sides of the opening 72.

The bottom surface of the upper liner plate 74 is aligned with the adjacent bottom surface of the lower leg 50 when this lower leg 50 carries the weight of the hold-down clamp 52. As best shown in FIGURE 3, a double-acting hydraulic motor 78 is secured, as by bolts 80 passing through attaching brackets 81 on the motor 78, to the upper side of the opening 72. The hydraulic motor 78 has a horizontally extending piston rod 82 which is movable towards and away from the shear head 16.

The free end of the piston rod 82 is fastened to an abutment member 84, slidably received between the liner plates 74 and 76. This abutment member 84 is movable partially out of the opening 72 so that its upper surface abuts the bottom surface of the lower leg 50, thereby locking the shear head 16 with the hold-down clamp 52. When the piston rod 82 is retracted within its hydraulic motor 78, the abutment member 84 assumes a position within the opening 72 (FIGURES 2 and 7) so that the shear head 16 is vertically movable between the bottom surface of the supporting plate 58 and the top surface of the reinforcing member 66. Vertical web plates 85 are spaced along the hold-down clamp 52 above the liner plate 74 and adjacent the heavy plate 54, for reinforcing purposes.

Positioned adjacent the rear of the shear is a work table 86, which, in some instances, may constitute the bottom of a charging box closed by a pivotally mounted lid plate 87. Also, there is provided adjacent the plate 70 a stationary scrap guide bar 88 which has an inclined bottom surface 90 corresponding to the inclination of the bottom plate 68, when the elements are in their uppermost position (FIGURE 2). This bar 88 is operative to confine the hold-down clamp 52 to its vertical path of movement, so as to control the scrap metal movement into the shear.

In operating the shear to crush scrap metal, this scrap metal is pushed across the table 86 beneath the work hold-down clamp 52, the lid 87 being closed. At this time, the piston rod 36 of the hydraulic motor 34 is in its uppermost position, with the work hold-down clamp 52 supported on the leg 50 (FIGURE 2). The hydraulic motor 78 is actuated to move the abutment member 84 beneath the lower leg 50 so that the elements are locked together (FIGURE 5). The hydraulic motor 34 is then actuated to move both the shear head 16 and the work hold-down clamp 52 in a downward direction (FIGURE 6), the scrap metal on the bed member 40 being crushed by the combined weight of these elements, and the force developed by the hydraulic cylinder 34. When the shear head 16 and the work hold-down clamp 52 have reached the position shown in FIGURE 6, the hydraulic motor 78 is actuated to retract the abutment member 84 within the opening 72. The shear head 16 is then actuated by the hydraulic motor 34 to move the same downwardly relative to the hold-down clamp 52, shearing the material between the movable cutting edge 38 and the stationary cutting edge 44 (FIGURE 7). The length of this stroke relative to the work hold-down clamp 52 is thereby determined by the distance between the bottom surface of the supporting plate 58 and the top surface of the reinforcing member 66. However, if desired, the stroke of the piston rod 36 can be such that, in its final movement, the leg 50 can ram against the top surface of the reinforcing member 66 to thereby compact still further the scrap metal on the bed member 40.

During this operation, the scrap between the bed member 40 and the bottom of the cross member 62 has been compacted for the next stroke by the shear head 16, and during the actual shearing of the scrap metal, the scrap metal on the bed member is held down solely by the weight of the work hold-down clamp 52.

Further, the inclined bottom plate 68 has angularly compacted a portion of the scrap metal which will be later compacted to a greater degree by the bottom surface of the cross member 62. By virtue of the upwardly inclined plate 68, the scrap on the work table 86 is crushed adjacent the entrance of the hold-down clamp 52 so that when the latter is raised, the scrap can be moved forwardly beneath the work hold-down clamp 52. This arrangement advantageously provides a shorter travel for the hydraulic motor 34 due to the fact the hold-down clamp 52 need not be raised as high to compact a given thickness of scrap metal as if the entire bottom surface were horizontal.

When the shearing has been completed, the piston 36 is retracted within the hydraulic motor 34, causing the upper surface 60 of the leg 50 to engage the supporting plate 58 so that the two elements are moved upwardly together (FIGURE 2). More scrap metal which has already been angularly compacted by the inclined plate 68, is fed across the bottom plate 64, while the compacted scrap metal which formerly occupied this position is moved beneath the shear head 16. The abutment member 84 is actuated to engage the lower leg 50, and the cycle is then repeated until all the scrap is sheared.

From the foregoing description of the preferred embodiment of this invention, it is evident that the objects of this invention, together with many practical advantages are successfully achieved. While the preferred embodiment of my invention has been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. A shearing machine comprising: a frame; a fixed blade mounted to said frame; a movable shearing blade structure carried by said frame for movement toward and away from said fixed blade to shear work therebetween; motor means operatively joined to said structure for moving the same; a movable hold-down clamp structure freely carried by said frame for movement toward and away from said fixed blade, said clamp structure being carried by said shearing blade structure for movement therewith away from said fixed blade; means providing a lost-motion connection between said shearing blade structure and said clamp structure; and means for selectively locking said structures together to prevent relative movement therebetween, whereby said structures locked together are movable in unison towards said fixed blade to compress the work, and when said structures are unlocked said shearing blade structure is movable relative to said clamp structure the distance of said lost-motion connection to thereby shear the work.

2. A shearing machine as defined in claim 1 including a bed member carried by said frame adjacent said fixed blade and in spaced relationship to said clamp structure, said clamp structure having an inclined bottom wall portion extending away from said bed member opposite said movable shearing blade structure whereby the work on said bed chamber is angularly compacted by said clamp structure.

3. A shearing machine as defined in claim 2 wherein said clamping structure also has a bottom wall between said inclined bottom wall and said movable shearing blade, the plane of said latter bottom wall being generally parallel to the plane of said bed member.

4. A shearing machine as defined in claim 1 in which the lost-motion connection means includes a transverse leg carried by said movable shearing blade structure for supporting said clamp structure, a supporting plate carried by said clamp structure arranged to rest on the surface of said transverse leg opposite from said fixed blade, and a transverse reinforcing member carried by said clamp structure in spaced relationship to said supporting plate and in the path of said transverse leg, whereby said lost motion connection is defined by the distance said transverse leg is movable between said supporting plate and said reinforcing member.

5. A shearing machine as defined in claim 4 wherein said locking means includes an abutment member movably carried by said clamp structure to selectively engage or disengage the side of said transverse leg opposite said supporting plate.

6. A shearing machine as defined in claim 5 including a hydraulic motor carried by said clamp structure and operatively joined to said abutment member to move the latter into and out of engagement with said transverse leg.

References Cited in the file of this patent

UNITED STATES PATENTS

| | | |
|---|---|---|
| 1,053,908 | Goldschmidt | Feb. 18, 1913 |
| 1,761,351 | Kutscheid | June 3, 1930 |
| 2,059,229 | Gregg | Nov. 3, 1936 |
| 3,005,403 | Van Endert | Oct. 24, 1961 |
| 3,037,446 | Thompson | June 5, 1962 |
| 3,049,988 | Lindemann et al. | Aug. 21, 1962 |

FOREIGN PATENTS

| | | |
|---|---|---|
| 281,794 | Germany | Feb. 1, 1915 |